United States Patent
Tomovic et al.

(10) Patent No.: US 10,907,006 B2
(45) Date of Patent: *Feb. 2, 2021

(54) TPU SHRINK MATERIAL

(71) Applicant: BASF SE, Ludwigshafen am Rhein (DE)

(72) Inventors: Zeljko Tomovic, Lemfoerde (DE); Frank Prissok, Lemfoerde (DE); Kathrin Cohen, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 30 days.

This patent is subject to a terminal disclaimer.

(21) Appl. No.: 16/063,514

(22) PCT Filed: Dec. 21, 2016

(86) PCT No.: PCT/EP2016/082130
§ 371 (c)(1),
(2) Date: Jun. 18, 2018

(87) PCT Pub. No.: WO2017/108920
PCT Pub. Date: Jun. 29, 2017

(65) Prior Publication Data
US 2019/0010274 A1    Jan. 10, 2019

(30) Foreign Application Priority Data
Dec. 22, 2015 (EP) .................... 15201997

(51) Int. Cl.
| C08G 18/48 | (2006.01) |
| C08G 18/66 | (2006.01) |
| C08G 18/76 | (2006.01) |
| C08G 18/24 | (2006.01) |
| C08G 18/32 | (2006.01) |
| C08G 18/40 | (2006.01) |
| C08G 18/42 | (2006.01) |

(52) U.S. Cl.
CPC ......... *C08G 18/664* (2013.01); *C08G 18/244* (2013.01); *C08G 18/3206* (2013.01); *C08G 18/4018* (2013.01); *C08G 18/4216* (2013.01); *C08G 18/4854* (2013.01); *C08G 18/6674* (2013.01); *C08G 18/7671* (2013.01); *C08G 2280/00* (2013.01)

(58) Field of Classification Search
CPC ..................................................... C08G 18/48

USPC ........................................................ 528/83
See application file for complete search history.

(56) References Cited

U.S. PATENT DOCUMENTS

| 5,821,180 A | 10/1998 | Iwata et al. |
| 7,524,914 B2 | 4/2009 | Mather et al. |
| 2008/0207846 A1 | 8/2008 | Henze et al. |
| 2008/0258352 A1 | 10/2008 | Hilmer et al. |
| 2011/0193256 A1 | 8/2011 | Henze et al. |
| 2012/0160413 A1 | 6/2012 | Laferte et al. |
| 2012/0279101 A1 | 11/2012 | Pretsch et al. |
| 2017/0173854 A1 | 6/2017 | Bokern et al. |

FOREIGN PATENT DOCUMENTS

| JP | 2005-102953 A | 4/2005 |
| WO | WO 2011/060970 A1 | 5/2011 |
| WO | WO 2015/144435 A1 | 10/2015 |

OTHER PUBLICATIONS

International Search Report dated Feb. 8, 2017, in PCT/EP2016/082130, filed Dec. 21, 2016.
Haas, P.F. et al. "Kunststoffhandbuch, Band 7, Polyurethane, Hilfs- and Zusatzstoffe für Polyurethane", 1993, pp. 104-113.
Diller, W. et al., "Kunststoffhandbuch, Band 7, Polyurethane, Rohstoffe", 1993, Ch, 3, pp. 57-75.
International Preliminary Report on Patentability dated Jun. 28, 2018 in PCT/EP2016/082130, 5 pages.

*Primary Examiner* — Duc Truong
(74) *Attorney, Agent, or Firm* — Oblon, McClelland, Maier & Neustadt, L.L.P.

(57) ABSTRACT

The present invention relates to a method for producing a molded body (MB) comprising the production of a thermoplastic polyurethane, the production of a molded body (MB*) from the thermoplastic polyurethane, heating the molded body (MB*) to a temperature below the temperature at which there is permanent deformability of the molded body (MB*), and above the switching temperature of the thermoplastic polyurethanes, elongating the heated molded body (MB*) with obtention of a molded body (MB), and cooling the molded body (MB) to a temperature below the switching temperature of the thermoplastic polyurethane, and the molded body obtained or obtainable by such a method. The present invention further relates to a thermoplastic polyurethane with shape memory and the use of a thermoplastic polyurethane for producing a molded body with shape memory effect in a temperature range from 0° C. to 130° C.

16 Claims, No Drawings

TPU SHRINK MATERIAL

The present invention relates to a method for producing a molded body (MB) comprising the production of a thermoplastic polyurethane, the production of a molded body (MB*) from the thermoplastic polyurethane, heating the molded body (MB*) to a temperature below the temperature at which there is permanent deformability of the molded body (MB*), and above the switching temperature of the thermoplastic polyurethane, elongating the heated molded body (MB*) with obtention of a molded body (MB), and cooling the molded body (MB) to a temperature below the switching temperature of the thermoplastic polyurethane, and the molded body obtained or obtainable by such a method. The present invention further relates to a thermoplastic polyurethane with shape memory and the use of a thermoplastic polyurethane for producing a molded body with shape memory effect in a temperature range from 0° C. to 130° C. Switching temperature is understood to mean the temperature at which a phase transition takes place below the melting temperature of the hard phase. This can be a glass transition or a melting transition of partly crystalline or fully crystalline structures.

JP 2005102953 describes a non-thermoplastic shape memory resin for the matching of teeth, which allows subsequent corrections. The resin is either polyurethane-, polyurethane-urea-, polynorbornene-, t-polyisoprene- or styrene-butadiene-based and has a glass transition temperature between 40 and 100° C. (preferably 60 to 80° C.).

Thermoplastic polyurethanes for various applications are in principle known from the prior art. By varying the materials used, different property profiles can be obtained. Thermoplastic polyurethanes which exhibit a shape memory effect are also in themselves known.

WO 2011/060970 A1 and the parallel US 2012/0279101 A1 disclose safety labels for the identification of goods in which a shape memory material based on thermoplastic polymers, inter alia also TPU, are used in a multilayer, very thin film. In this, the shape memory materials are only a part of the labels described and are used in combination with bonding agents and further components.

Bisphenol A-based compounds are used as chain extenders for the hard phase. As chain extenders in the hard phase, these exhibit disadvantages in the mechanical properties.

In WO 2015/144435 A1, molded bodies with shape memory effect are disclosed, which contain a thermoplastic polyurethane which is obtained by reaction of a polyisocyanate composition, a chain extender and a polyol composition which comprises at least one bisphenol derivative selected from the group consisting of bisphenol A derivatives with a molecular weight Mw>315 g/mol and bisphenol S derivatives with a molecular weight Mw>315 g/mol, wherein at least one of the OH groups of the bisphenol derivative is alkoxylated. Disadvantageous is the content of harmful to health bisphenol.

U.S. Pat. No. 7,524,914 B2 describes the production of a shape memory TPU through the use of a dihydroxyl-terminated polyhedral oligosilsesquioxane. This is very complicated to produce.

Starting from the prior art, an objective on which the present invention is based consisted in providing a thermoplastic polyurethane with a shape memory effect, which is in particular suitable for applications which come into contact with foods. A further objective of the present invention consisted in providing a thermoplastic polyurethane with a shape memory effect which is in particular suitable for applications which come into contact with foods, and which can be produced simply and inexpensively in a one-shot method.

According to the invention, this problem is solved by a method for producing a molded body (MB) comprising the following steps:
(a) producing a thermoplastic polyurethane comprising reacting
  (i) at least one polyisocyanate composition,
  (ii) at least one chain extender, and
  (iii) at least one polyol composition,
  wherein the polyol composition comprises at least one polyol (P1), which comprises at least one aromatic polyester block (B1);
(b) producing a molded body (MB*) from the thermoplastic polyurethane,
(c) heating the molded body (MB*) to a temperature below the temperature at which there is permanent deformability of the molded body (MB*), and above the switching temperature of the thermoplastic polyurethane,
(d) elongating the heated molded body (MB*) with obtention of a molded body (MB), and
(e) cooling the molded body (MB) to a temperature below the switching temperature of the thermoplastic polyurethane.

According to the invention, the polyol (P1) contains an aromatic polyester block (B1). In the context of the present invention, this is understood to mean that the aromatic polyester block (B1) can be a polyester of an aromatic dicarboxylic acid and an aliphatic diol or a polyester of an aliphatic dicarboxylic acid and an aromatic diol. Preferably in the context of the present invention the aromatic polyester block (B1) is a polyester of an aromatic dicarboxylic acid and an aliphatic diol. Suitable aromatic dicarboxylic acids here are for example terephthalic acid, isophthalic acid or phthalic acid, preferably terephthalic acid. Accordingly, suitable polyols (P1) in the context of the present invention are those which for example contain at least one polyethylene terephthalate block or at least one polybutylene terephthalate block, wherein the number of the repeating units of the aromatics is at least 2 in a row. Preferably the aromatic polyester block (B1) is produced in a separate step before the further reaction to polyol (P1), in order to ensure an adequate block length of the repeating units of the aromatics.

According to a further embodiment, the present invention accordingly relates to a method as described above, wherein the aromatic polyester block (B1) is a polyester of an aromatic dicarboxylic acid and an aliphatic diol. According to a further embodiment, the present invention also relates to a method as described above, wherein the aromatic polyester block (B1) is a polyethylene terephthalate block.

According to one embodiment, the present invention thus also relates to a method for producing a molded body (MB) comprising the following steps:
(a) producing a thermoplastic polyurethane comprising reacting
  (i) at least one polyisocyanate composition,
  (ii) at least one chain extender, and
  (iii) at least one polyol composition,
  wherein the polyol composition comprises at least one polyol (P1) which contains at least one polyethylene terephthalate block;
(b) producing a molded body (MB*) from the thermoplastic polyurethane,
(c) heating the molded body (MB*) to a temperature below the temperature at which there is permanent deformability of the molded body (MB*), and above the switching temperature of the thermoplastic polyurethane, (d) elongating the heated molded body (MB*) with obtention of a molded body (MB), and (e) cooling the molded body (MB) to a temperature below the switching temperature of the thermoplastic polyurethane.

The present invention further relates to a thermoplastic polyurethane obtainable or obtained by reaction of at least the components (i) to (iii):

(i) a polyisocyanate composition,
(ii) at least one chain extender, and
(iii) at least one polyol composition, wherein the polyol composition comprises at least one polyol (P1) which contains at least one aromatic polyester block (B1). According to a further embodiment, the present invention relates to a thermoplastic polyurethane obtainable or obtained by reaction of at least the components (i) to (iii):

(i) a polyisocyanate composition,
(ii) at least one chain extender, and
(iii) at least one polyol composition, wherein the polyol composition comprises at least one polyol (P1) which contains at least one polyethylene terephthalate block.

Surprisingly it was found that through the method according to the invention and the use of a thermoplastic polyurethane based on polyols with at least one aromatic polyester block (B1) as defined above, in particular with a polyethylene terephthalate block, chain extenders and diisocyanate molded bodies or thermoplastic polyurethanes are obtained which exhibit a shape memory effect.

According to the invention, the thermoplastic polyurethane can in particular be a compact thermoplastic polyurethane. Accordingly, the present invention according to a further embodiment relates to a method as described above, wherein the thermoplastic polyurethane is a compact thermoplastic polyurethane.

According to the method according to the invention, firstly the molded body (MB*) produced from the thermoplastic polyurethane is elongated (for example inflated) at a temperature above the switching temperature and in the elongated state cooled to a temperature below the switching temperature. In the process, a molded body (MB) is obtained, which is elongated compared to the molded body (MB*) and is stable in this elongated state. The elongation of the material is thus "frozen in". By renewed heating of the molded body (MB) to a temperature above the switching temperature, the TPU or the molded body very rapidly deforms back to its original elongation, i.e. to the elongation of the unelongated molded body (MB*). During this, depending on the process, a residual elongation of up to 20% can remain.

The method according to the invention comprises the steps (a) to (e). In this, firstly according to step (a) a thermoplastic polyurethane is produced by reaction of at least one polyisocyanate composition, at least one chain extender and at least one polyol composition. Here according to the invention, the polyol composition comprises at least one polyol (P1) which contains at least one block (B1) as defined above, in particular a polyethylene terephthalate block.

According to step (b) a molded body (MB*) is produced from the thermoplastic polyurethane obtained according to step (a). Here the molded body (MB*) can for example in the context of the present invention also be a film. Also, in the context of the present invention the production of the molded body (MB*) can be effected in all usual ways, for example by extrusion, injection molding, sinter methods or from solution.

According to a further embodiment, the present invention accordingly relates to a method as described above, wherein the molded body (MB*) is produced by extrusion, injection molding, sinter methods or from solution.

According to step (c) of the method according to the invention, the molded body (MB*) is heated to a temperature below the temperature at which there is permanent deformability of the molded body (MB*), thus for example to a temperature below the melting point, and above the switching temperature of the thermoplastic polyurethane.

According to a further embodiment, the present invention accordingly relates to a method as described above, wherein the start of the permanent deformability corresponds to the start of the melting of the hard phase of the thermoplastic polyurethane, and the switching temperature corresponds to the start of the phase transition lying highest in the temperature before the melting range.

Suitable thermoplastic polyurethanes have for example a melting temperature in the range from 140 to 250° C. auf, preferably in the range from 160 to 230° C.

Suitable thermoplastic polyurethanes have for example a switching temperature in the range from 0 to 130° C., preferably in the range from 20 to 100° C., especially preferably in the range from 30 to 80° C.

According to a further embodiment, the present invention accordingly relates to a method as described above, wherein the switching temperature of the thermoplastic polyurethane ($T_{switching}$) lies in the range from 0 to 130° C.

The heating can according to the invention be effected in any suitable manner known to those skilled in the art. Preferably, the heating is effected by electrical heating, heating via heated oil or water, induction fields, hot air, IR radiation or energy-rich radiation (laser).

The molded body (MB*) heated according to step (c) of the method according to the invention is then elongated according to step (d) of the method. According to the invention, the molded body can be elongated in one, two or three dimensions. During this, the molded body can become stretched, in particular when the molded body is a film or also is inflated. After the elongation, the elongation of the molded body in at least one dimension is greater than before the elongation. Here the elongation of the molded body (MB) obtained according to step (d) is preferably in at least one dimension at least 150% of the elongation of the molded body (MB*), more preferably at least 175% of the elongation of the molded body (MB*). The elongation in one dimension can also be brought about by compression in another dimension.

According to a further embodiment, the present invention accordingly relates to a method as described above, wherein the elongation of the molded body (MB) obtained according to step (d) in at least one dimension is at least 150% of the elongation of the molded body (MB*).

According to the invention, the molded body (MB*) has a sufficient wall thickness to ensure the elongation according to step (d). During the elongation of the molded body, the wall thickness can become smaller.

According to step (e), the elongated molded body (MB) is then cooled to a temperature below the switching temperature of the thermoplastic polyurethane. During this, according to the invention the elongation of the molded body (MB) remains essentially constant. According to the invention, after cooling and stress relief according to step (e), a direct shrinkage of less than 15% or no shrinkage no takes place.

It was found that a molded body (MB) obtained by a method according to the invention exhibits a shape memory effect. According to the invention, this is achieved through the specific procedure in combination with the thermoplastic polyurethane used according to the invention.

Thus according to the invention, the elongation of the molded body (MB) obtained can remain essentially constant during the cooling to temperatures below the switching temperature and relax by at least 20% during a subsequent heating above the glass transition, i.e. the molded body shrinks. During the heating to a temperature above the switching temperature, the elongation at most relaxes to the original elongation.

In the context of the present invention, it is essential that during the production of the thermoplastic polyurethane according to step (a) at least one chain extender and the polyol composition as described above are used.

According to the invention, one chain extender can be used, however mixtures of different chain extenders can also be used.

As chain extenders in the context of the present invention, for example compounds with hydroxyl or amino groups can be used, in particular with 2 hydroxyl or amino groups. However, according to the invention it is also possible that mixtures of different compounds are used as chain extenders. In that case, according to the invention the average functionality of the mixture is 2.

According to the invention, compounds with hydroxyl groups, in particular diols, are preferably used as chain extenders. In that case, aliphatic, araliphatic, aromatic and/or cycloaliphatic diols with a molecular weight from 50 g/mol to 220 g/mol can preferably be used. Alkanediols with 2 to 10 C atoms in the alkylene residue, in particular di-, tri-, tetra-, penta-, hexa-, hepta-, octa-, nona- and/or decaalkylene glycols, are preferable. For the present invention, 1,2-ethylene glycol, 1,3-propanediol, 1,4-butanediol, 1,6-hexanediol are especially preferable. Aromatic compounds such as hydroxylquinone (bis(2-hydroxylethyl)) ether can also be used.

According to the invention, compounds with amino groups can also be used, for example diamines. Also, mixtures of diols and diamines can be used.

Preferably, the chain extender is a diol with a molecular weight Mw<220 g/mol. According to the invention it is possible that only one diol with a molecular weight Mw<220 g/mol is used for the production of the transparent, thermoplastic polyurethane.

According to a further embodiment, more than one diol are used as chain extenders. Thus mixtures of chain extenders can also be used, wherein at least one diol has a molecular weight Mw<220 g/mol. If more than one chain extender are used, then the second or further chain extenders can also have a molecular weight 220 g/mol.

According to a further embodiment, the chain extender is selected from the group consisting of 1,4-butanediol and 1,6-hexanediol.

According to a further embodiment, the present invention accordingly relates to a method as described above, wherein the chain extender used according to (i) in step (a) of the method according to the invention is a diol with a molecular weight Mw<220 g/mol.

The chain extender, in particular the diol with a molecular weight Mw<220 g/mol, is preferably used in a molar ratio in the range from 40:1 to 1:10 to the polyol (P1). Preferably the chain extender and the polyol (P1) are used in a molar ratio in the range from 20:1 to 1:9, more preferably in the range from 10:1 to 1:8, for example in the range from 5:1 to 1:5, or also in the range from 4:1 to 1:4, more preferably in the range from 3:1 to 1:2.

According to a further embodiment, the present invention accordingly relates to a method as described above, wherein the chain extender used according to (i) and the polyol (P1) contained in the polyol composition are used in a molar ratio from 40 to 1 to 1 to 10.

According to the invention, the polyol composition comprises at least one polyol (P1) which contains at least one aromatic polyester block (B1). Preferably the polyol (P1) is a polyol which contains at least one polyethylene terephthalate block.

In the context of the present invention, those polyols (P1) which are based on aromatic polyesters, such as polybutylene terephthalate (PBT) or polyethylene terephthalate (PET), are particularly suitable. Preferably here for the production of the polyol (P1) the aromatic polyester is reacted with dicarboxylic acids and diols to give mixed aromatic/aliphatic polyester diols. For example, in the context of the present invention it is possible to react the aromatic polyester in solid or liquid form with dicarboxylic acids and diols. According to the invention, in this case the aromatic polyester used normally has a higher molecular weight than the blocks (B1) contained in the polyol (P1).

According to the invention, suitable polyester polyols (P1) typically contain 1 to 70 wt. %, preferably 3 to 60 wt. %, especially preferably 5 to 50 wt. %, quite especially preferably 10 to 40 wt. % of the aromatic polyester blocks (B1).

Typically the polyol (P1) has a molecular weight Mn in the range from 500 to 2500, preferably in the range from 500 to 2000, especially preferably in the range from 750 to 1500, quite especially preferably in the range from 1000 to 1500 g/mol.

In the production of the polyols (P1), diols with 2 to 10 carbon atoms, for example ethanediol, propanediol, butanediol, pentanediol, hexanediol or di- or triethylene glycol, in particular 1,4-butanediol or mixtures thereof are preferably used. Short polyether diols, such as for example PTHF250 or PTHF 650 or a short-chain polypropylene glycol such as a PPG 500 can also be used. As dicarboxylic acids, for example linear or branched-chain diacids with four to 12 carbon atoms or mixtures thereof can be used. Preferably, adipic acid, succinic acid, glutaric acid or sebacic acid or a mixture of said acids are used. Especially preferable in the context of the present invention is adipic acid. According to the invention, in the production of the polyols (P1) further polyester diols, for example butanediol adipate or ethylene adipate, can also be used as starting materials.

According to the invention, the polyol composition can contain further polyols as well as the at least one polyol (P1). Accordingly, in the context of the present invention at least one chain extender and a polyol composition comprising at least one polyol (P1) as described above and at least one further polyol can also be used.

Preferably, the further polyols contain no polyethylene terephthalate block. According to a further embodiment, the present invention accordingly relates to a method as described above, wherein the polyol composition comprises a polyol selected from the group consisting of polyetherols, polyesterols, polycarbonate alcohols and hybrid polyols.

As higher molecular weight compounds with hydrogen atoms reactive towards isocyanates, the generally known polyols with compounds reactive towards isocyanates can be used.

Polyols are in principle known to those skilled in the art and for example described in the "Kunststoffhandbuch, Band 7, Polyurethane" [Plastics Manual, Volume 7, Polyurethanes], Carl Hanser Verlag, 3$^{rd}$ Edition 1993, Chapter 3.1. Especially preferably, polyesterols or polyetherols are used as polyols. Especially preferable are polyester polyols. Likewise, polycarbonates can be used. Copolymers can also be used in the context of the present invention. The number average molecular weight of the polyols used according to the invention preferably lie between $0.5 \times 10^3$ g/mol and $8 \times 10^3$ g/mol, preferably between $0.6 \times 10^3$ g/mol and $5 \times 10^3$ g/mol, in particular between $0.8 \times 10^3$ g/mol and $3 \times 10^3$ g/mol.

Preferably they possess an average functionality towards isocyanates of 1.8 to 2.3, especially preferably 1.9 to 2.2, in particular 2.

As polyesterols, polyesterols based on diacids and diols can be used. As diols, diols with 2 to 10 carbon atoms, for example ethanediol, propanediol, butanediol, pentanediol, hexanediol or di- or triethylene glycol, in particular 1,4-butanediol or mixtures thereof are preferably used. As diacids, all known diacids can be used, for example linear or branched-chain diacids with four to 12 carbon atoms or mixtures thereof. Preferably, adipic acid is used as the diacid.

Preferred polyetherols according to the invention are polyethylene glycols, polypropylene glycols and polytetrahydrofurans.

According to an especially preferred embodiment, the polyol is a polytetrahydrofuran (PTHF) with a molecular weight in the Mn range from 600 g/mol to 2500 g/mol.

According to the invention, as well as PTHF various further polyethers are suitable, but polyesters, block copolymers and hybrid polyols such as for example poly(ester/amide) are also usable.

Preferably, the polyols used have an average functionality between 1.8 and 2.3, preferably between 1.9 and 2.2, in particular 2. Preferably, the polyols used according to the invention have only primary hydroxyl groups.

According to the invention, the polyol can be used in pure form or in the form of a composition containing the polyol and at least one solvent. Suitable solvents are in themselves known to those skilled in the art.

The additional polyol is preferably used in a molar ratio in the range from 10:1 to 1:10 to the polyol (P1). In more preferred embodiments, the further polyol and the polyol (P1) are used in a molar ratio in the range from 9:1 to 1:9, more preferably in the range from 5:1 to 1:5.

According to the invention, at least one polyisocyanate is used. According to the invention, mixtures of two or more polyisocyanates can also be used.

Preferred polyisocyanates in the context of the present invention are diisocyanates, in particular aliphatic or aromatic diisocyanates, more preferably aromatic diisocyanates.

According to a further embodiment, the present invention accordingly relates to a method as described above, wherein the polyisocyanate is an aromatic diisocyanate.

Furthermore, in the context of the present invention prereacted prepolymers can be used as isocyanate components in which a part of the OH components are reacted with an isocyanate in an upstream reaction step. In a subsequent step, the actual polymer reaction, these prepolymers are reacted with the remaining OH components and then form the thermoplastic polyurethane. The use of prepolymers offers the possibility of also using OH components with secondary alcohol groups.

As aliphatic diisocyanates, usual aliphatic and/or cycloaliphatic diisocyanates are used, for example tri-, tetra-, penta-, hexa-, hepta- and/or octamethylene diisocyanate, 2-methyl-1,5-pentamethylene diisocyanate, 2-ethyl-1,4-tetramethylene diisocyanate, 1,6-hexamethylene diisocyanate (HDI), 1,5-pentamethylene diisocyanate, 1,4-butylene diisocyanate, trimethyl-1,6-hexamethylene diisocyanate, 1-isocyanato-3,3,5-trimethyl-5-isocyanatomethyl-cyclohexane (isophorone diisocyanate, IPDI), 1,4- and/or 1,3-bis (isocyanatomethyl)cyclohexane (HXDI), 1,4-cyclohexane diisocyanate, 1-methyl-2,4- and/or 1-methyl-2,6-cyclohexane diisocyanate, 4,4'-, 2,4'- and/or 2,2'-methylenedicyclohexyl diisocyanate (H12MDI).

Preferred aliphatic polyisocyanates are 1,6-hexamethylene diisocyanate (HDI), 1-isocyanato-3,3,5-trimethyl-5-isocyanatomethyl-cyclohexane and 4,4'-, 2,4'- and/or 2,2'-methylenedicyclohexyl diisocyanate (H12MDI); 4,4'-, 2,4'- and/or 2,2'-methylenedicyclohexyl diisocyanate (H12MDI) and 1-isocyanato-3,3,5-trimethyl-5-isocyanatomethyl-cyclohexane or mixtures thereof are particularly preferable.

Accordingly, the present invention according to a further embodiment relates to a method as described above, wherein the polyisocyanate is selected from the group consisting of 4,4'-, 2,4'- and/or 2,2'-methylenedicyclohexyl diisocyanate (H12MDI), hexamethylene diisocyanate (HDI) and 1-isocyanato-3,3,5-trimethyl-5-isocyanatomethyl-cyclohexane (IPDI) or mixtures thereof.

Suitable aromatic diisocyanates are in particular 2,2'-, 2,4'- and/or 4,4'-diphenylmethane diisocyanate (MDI), 1,5-naphthylene diisocyanate (NDI), 2,4- and/or 2,6-toluylene diisocyanate (TDI), 3,3'-dimethyl-4,4'-diisocyanato-diphenyl (TODI), p-phenylene diisocyanate (PDI), diphenylethane-4,4'-diisocyanate (EDI), diphenylmethane diisocyanate, 3,3'-dimethyl-diphenyl diisocyanate, 1,2-diphenylethane diisocyanate and/or phenylene diisocyanate.

Preferred aromatic diisocyanates are 2,2'-, 2,4'- and/or 4,4'-diphenylmethane diisocyanate (MDI) and mixtures thereof.

Preferred examples of higher functional isocyanates are triisocyanates, e.g. triphenylmethane 4,4',4"-triisocyanate, furthermore the cyanurates of the aforesaid diisocyanates, and the oligomers obtainable by partial reaction of diisocyanates with water, e.g. the biurets of the aforesaid diisocyanates, further, oligomers which are obtained by targeted reaction of semi-blocked diisocyanates with polyols which on average contain more than 2 and preferably 3 or more hydroxyl groups.

According to a further embodiment, the present invention relates to a method as described above, wherein the polyisocyanate is an aliphatic diisocyanate.

According to the invention, the polyisocyanate can be used in pure form or in the form of a composition containing the polyisocyanate and at least one solvent. Suitable solvents are known to those skilled in the art. For example, non-reactive solvents such as ethyl acetate, methyl ethyl ketone, tetrahydrofuran and hydrocarbons are suitable.

According to the invention, in the reaction of the at least one aliphatic polyisocyanate, the at least one chain extender, and the at least one polyol composition, further starting materials can be added, for example catalysts or auxiliary agents and additives.

Suitable auxiliary agents and additives are in themselves known to those skilled in the art. For example surface-active substances, flame retardants, nucleating agents, oxidation stabilizers, antioxidants, lubricating and parting agents, dyes and pigments, stabilizers, e.g. against hydrolysis, light, heat or discoloration, inorganic and/or organic fillers, reinforcing agents and plasticizers may be mentioned. Suitable auxiliary agents and additives can for example be taken from Kunststoffhandbuch, Band VII [Plastics Handbook, Volume VII], published by Vieweg and Hochtlen, Carl Hanser Verlag, Munchen 1966 (pp 103-113).

Suitable catalysts are also in principle known from the prior art. Suitable catalysts are for example organic metal compounds selected from the group consisting of tin, titanium, zirconium, hafnium, bismuth, zinc, aluminum and iron organyls, such as for example tin organyl compounds, preferably tin dialkyls such as tin-II isooctoate, tin dioctoate, dimethyltin or diethyltin, or tin organyl compounds of aliphatic carboxylic acids, preferably tin diacetate, tin dilaurate, dibutyltin diacetate, dibutyltin dilaurate, titanate esters, bismuth compounds, such as bismuth alkyl compounds, preferably bismuth neodecanoate or the like, or iron compounds, preferably iron-(III) acetylacetonate.

According to a preferred embodiment, the catalysts are selected from tin compounds and bismuth compounds, more preferably tin alkyl compounds or bismuth alkyl compounds. Especially suitable are tin-II isooctoate and bismuth neodecanoate.

The catalysts are normally used in quantities from 3 ppm to 2000 ppm, preferably 10 ppm to 1000 ppm, more preferably 20 ppm to 500 ppm and most preferably from 30 ppm to 300 ppm.

The method according to step (a) can in principle be performed under reaction conditions in themselves known.

According to a preferred embodiment, the method according to step (a) is performed at temperatures higher than room temperature, more preferably in the range between 50° C. and 200° C., especially preferably in the range from 65° C. and 150° C., in particular in the range from 75° C. and 120° C.

The heating can according to the invention be effected in any suitable manner known to those skilled in the art. Preferably by electrical heating, heating by means of heated oil or water, induction fields, hot air or IR radiation.

According to the invention, the thermoplastic polyurethanes are processed into a molded body (MB*). Accordingly, the method comprises step (a) and the steps (b) to (e). According to the invention, the method can comprise further steps, for example temperature treatments. Preferably however, the method according to the invention contains precisely the steps (a) to (e) with no further intermediate steps.

According to a further embodiment, the present invention relates to a method as described above, wherein the molded body (MB) through heating to a temperature above the switching temperature undergoes a recovery. Preferably a recovery by at least 20% takes place. Accordingly, the present invention according to a further embodiment also relates to a method as described above, wherein the molded body (MB) through heating to a temperature above the switching temperature undergoes a recovery by at least 20%.

With the method according to the invention, a molded body (MB) is obtained which exhibits a shape memory effect. According to a further aspect, the present invention also relates to molded bodies obtainable or obtained according to a method as described above.

In principle the molded body (MB) can be bodies of all possible shapes, for example extrusion products such as films and other molded bodies, wherein these are preferably a film or a tube.

According to a further embodiment, the present invention accordingly relates to a molded body as described above, wherein the molded body is a tube or a film.

The present invention further relates to a thermoplastic polyurethane obtainable or obtained by reaction of at least the components (i) to (iii):
(i) a polyisocyanate composition,
(ii) at least one chain extender, and
(iii) at least one polyol composition,
wherein the polyol composition comprises at least one polyol (P1) which contains at least one aromatic polyester block (B1).

In particular the present invention relates to a thermoplastic polyurethane obtainable or obtained by reaction of at least the components (i) to (iii):
(i) a polyisocyanate composition,
(ii) at least one chain extender, and
(iii) at least one polyol composition,
wherein the polyol composition comprises at least one polyol (P1) which contains at least one polyethylene terephthalate block.

Concerning the preferred embodiments, reference is made to the above explanations.

The present invention also relates to the use of a thermoplastic polyurethane for producing a molded body with shape memory effect in a temperature range from 0° C. to 130° C., wherein the thermoplastic polyurethane is obtainable or obtained by reaction of at least the components (i) to (iii):
(i) a polyisocyanate composition,
(ii) at least one chain extender, and
(iii) at least one polyol composition,
wherein the polyol composition comprises at least one polyol (P1) which contains at least one aromatic polyester block (B1).

In particular the present invention also relates to the use of a thermoplastic polyurethane for producing a molded body with shape memory effect in a temperature range from 0° C. to 130° C., wherein the thermoplastic polyurethane is obtainable or obtained by reaction of at least the components (i) to (iii):
(i) a polyisocyanate composition,
(ii) at least one chain extender, and
(iii) at least one polyol composition,
wherein the polyol composition comprises at least one polyol (P1) which contains at least one polyethylene terephthalate block.

According to a further embodiment, the present invention accordingly relates to the use of a thermoplastic polyurethane for producing a molded body with shape memory effect as described above, wherein the molded body is a shrink tube or a shrink film.

Further embodiments of the present invention can be taken from the claims and the examples. It goes without saying that the features of the subject matter/method/uses according to the invention mentioned above and those explained below are usable not only in the combination stated in each case, but are also usable in other combinations, without departing from the scope of the invention. Thus for example the combination of a preferred feature with an especially preferred feature, or a not further characterized feature with an especially preferred feature etc. is also implicitly comprised even if this combination is not expressly mentioned.

Below, by way of example embodiments of the present invention are described, however these do not limit the present invention. In particular, the present invention also comprises those embodiments which follow from the references stated below and combinations therewith.

1. A method for producing a molded body (MB) comprising the following steps:
   (a) producing a thermoplastic polyurethane comprising reacting
      (i) at least one polyisocyanate composition,
      (ii) at least one chain extender, and
      (iii) at least one polyol composition,
      wherein the polyol composition comprises at least one polyol (P1) which contains at least one aromatic polyester block (B1);
   (b) producing a molded body (MB*) from the thermoplastic polyurethane,
   (c) heating the molded body (MB*) to a temperature below the temperature at which there is permanent deformability of the molded body (MB*), and above the switching temperature of the thermoplastic polyurethane,
   (d) elongating the heated molded body (MB*) with obtention of a molded body (MB), and
   (e) cooling the molded body (MB) to a temperature below the switching temperature of the thermoplastic polyurethane.
2. The method as stated in embodiment 1, wherein the aromatic polyester block (B1) is a polyester of an aromatic dicarboxylic acid and an aliphatic diol.
3. The method as stated in embodiment 1 or 2, wherein the aromatic polyester block (B1) is a polyethylene terephthalate block.
4. A method for producing a molded body (MB) comprising the following steps:
   (a) producing a thermoplastic polyurethane comprising reacting
      (i) at least one polyisocyanate composition,
      (ii) at least one chain extender, and
      (iii) at least one polyol composition,
      wherein the polyol composition comprises at least one polyol (P1) which contains at least one polyethylene terephthalate block;
   (b) producing a molded body (MB*) from the thermoplastic polyurethane,
   (c) heating the molded body (MB*) to a temperature below the temperature at which there is permanent deformability of the molded body (MB*), and above the switching temperature of the thermoplastic polyurethane,
   (d) elongating the heated molded body (MB*) with obtention of a molded body (MB),
   (e) cooling the molded body (MB) to a temperature below the switching temperature of the thermoplastic polyurethane.
5. The method as stated in one of the embodiments 1 to 4, wherein the thermoplastic polyurethane is a compact thermoplastic polyurethane.
6. The method as stated in one of the embodiments 1 to 5, wherein the start of the permanent deformability corresponds to the start of the melting of the hard phase of the thermoplastic polyurethane, and the switching temperature corresponds to the start of the phase transition lying highest in the temperature before the melting range.
7. The method as stated in one of the embodiments 1 to 6, wherein the switching temperature of the thermoplastic polyurethane ($T_{switching}$) lies in the range from 0 to 130° C.
8. The method as stated in one of the embodiments 1 to 7, wherein the elongation of the molded body (MB) obtained according to step (d) in at least one dimension is at least 150% of the elongation of the molded body (MB*).
9. The method as stated in one of the embodiments 1 to 8, wherein the molded body (MB*) is produced in step (b) by extrusion, injection molding, sinter methods or from solution.
10. The method as stated in one of the embodiments 1 to 9, wherein the chain extender used according to (i) is a diol with a molecular weight Mw<220 g/mol.
11. The method as stated in one of the embodiments 1 to 10, wherein the chain extender used according to (i) and the polyol (P1) contained in the polyol composition are used in a molar ratio from 40 to 1 to 1 to 10.
12. The method as stated in one of the embodiments 1 to 11, wherein the polyol composition comprises a further polyol selected from the group consisting of polyetherols, polyesterols, polycarbonate alcohols and hybrid polyols.
13. The method as stated in one of the embodiments 1 to 12, wherein the polyisocyanate is an aromatic diisocyanate.
14. The method as stated in one of the embodiments 1 to 13, wherein the molded body (MB) through heating to a temperature above the switching temperature undergoes a recovery.
15. The method as stated in embodiment 14, wherein the molded body (MB) through heating to a temperature above the switching temperature undergoes a recovery by at least 20%.
16. A molded body, obtainable or obtained according to a method as stated in one of the embodiments 1 to 15.
17. The molded body as stated in embodiment 16, wherein the molded body is a tube or a film.
18. A thermoplastic polyurethane obtainable or obtained by reaction of at least the components (i) to (iii):
   (i) a polyisocyanate composition,
   (ii) at least one chain extender, and
   (iii) at least one polyol composition,
   wherein the polyol composition comprises at least one polyol (P1) which contains at least one aromatic polyester block (B1).
19. A thermoplastic polyurethane obtainable or obtained by reaction of at least the components (i) to (iii):
   (i) a polyisocyanate composition,
   (ii) at least one chain extender, and
   (iii) at least one polyol composition,
   wherein the polyol composition comprises at least one polyol (P1) which contains at least one polyethylene terephthalate block.
20. The thermoplastic polyurethane as stated in embodiment 18, wherein the polyol (P1) is based on polybutylene terephthalate (PBT) or polyethylene terephthalate (PET).
21. The thermoplastic polyurethane as stated in embodiment 18, wherein the polyol (P1) contains at least one polyethylene terephthalate block.
22. The thermoplastic polyurethane as stated in one of the embodiments 18 to 21, wherein the polyol (P1) contains 1 to 70 wt. % of the aromatic polyester blocks (B1).
23. The thermoplastic polyurethane as stated in one of the embodiments 18 to 22, wherein the polyol (P1) has a molecular weight Mn in the range from 500 to 2500 g/mol.
24. The thermoplastic polyurethane as stated in one of the embodiments 18 to 23, wherein the chain extender is a diol with a molecular weight Mw<220 g/mol.
25. The thermoplastic polyurethane as stated in one of the embodiments 18 to 24, wherein the polyisocyanate is an aromatic diisocyanate.
26. Use of a thermoplastic polyurethane for producing a molded body with shape memory effect in a temperature range from 0° C. to 130° C., wherein the thermoplastic polyurethane is obtainable or obtained by reaction of at least the components (i) to (iii):
(i) a polyisocyanate composition,
(ii) at least one chain extender, and
(iii) at least one polyol composition,
wherein the polyol composition comprises at least one polyol (P1) which contains at least one aromatic polyester block (B1).

27. Use of a thermoplastic polyurethane for producing a molded body with shape memory effect in a temperature range from 0° C. to 130° C., wherein the thermoplastic polyurethane is obtainable or obtained by reaction of at least the components (i) to (iii):
(i) a polyisocyanate composition,
(ii) at least one chain extender, and
(iii) at least one polyol composition,
wherein the polyol composition comprises at least one polyol (P1) which contains at least one polyethylene terephthalate block.

28. Use as stated in embodiment 26 or 27, wherein the molded body is a shrink tube or a shrink film.

The following examples serve for illustration of the invention, but are in no way limiting with regard to the subject matter of the present invention.

EXAMPLES

1 The Following Starting Materials were Used

Polyol 1: Polyester polyol based on adipic acid, 1,4-butanediol and monoethylene glycol with MW 2000 g/mol and an OH number of 56, functionality: 2
Polyol 2: Polyether polyol based on tetramethylene oxide with an OH number of 113.9 and exclusively primary OH groups, functionality: 2
Polyol 3: Polyester polyol based on adipic acid, succinic acid, glutaric acid, PET and diethylene glycol and an OH number of 75.6 and functionality: 2
Polyol 4: Polyester polyol based on adipic acid, succinic acid, glutaric acid, PET and diethylene glycol and an OH number of 110.6 and functionality: 2
Polyol 5: Polyester polyol based on adipic acid, PET and diethylene glycol, and an OH number of 113.8 and functionality: 2
Isocyanate 1: aromatic isocyanate (4,4' methylenediphenyl diisocyanate)
CE: 1,4-butanediol
Catalyst 1: tin-II isooctoate (50% in dioctyl adipate)
Stabilizer 1: hydrolysis stabilizer based on carbodiimides
Stabilizer 2: sterically hindered phenol 2 Synthesis of the Polyester Polyols with PET Blocks 2.1 Synthesis of Polyol 3

Firstly 1040.9 g of dicarboxylic acid mixture (consisting of adipic acid, glutaric acid and succinic acid) and 1016.2 g of diethylene glycol are added to a 3000 ml round-necked flask equipped with thermometer, nitrogen inlet, stirrer and heating mantle. The mixture is then heated at 120° C. until a homogeneous mixture is formed. 750 g of polyethylene terephthalate (PET) are now added to the mixture. The reaction mixture is heated further at 240° C. and the water of reaction formed continuously removed. During the whole synthesis, the PET flakes are slowly decomposed and a transparent mixture is formed, which is condensed until a product with an acid number <1.0 mg KOH/g is obtained.

The polymer obtained has the following properties
Hydroxyl number: 75.6 mg KOH/g
Acid number: 0.7 mg KOH/g
Viscosity at 75° C.: 840 mPas 2.2 Synthesis of Polyol 4

Firstly 819.5 g of dicarboxylic acid mixture (consisting of adipic acid, glutaric acid and succinic acid) and 925.9 g of diethylene glycol are added to a 3000 ml round-necked flask equipped with thermometer, nitrogen inlet, stirrer and heating mantle. The mixture is then heated at 120° C. until a homogeneous mixture is formed. 1000 g of polyethylene terephthalate (PET) are now added to the mixture. The reaction mixture is further heated at 240° C. and the water of reaction formed continuously removed. During the whole synthesis the PET flakes are slowly decomposed and a transparent mixture is formed, which is condensed until a product with an acid number <1.0 mg KOH/g is obtained.

The polymer obtained has the following properties
Hydroxyl number: 110.6 mg KOH/g
Acid number: 0.6 mg KOH/g
Viscosity at 75° C.: 660 mPas 2.3 Synthesis of Polyol 5

Firstly 1008.4 g of adipic acid and 1020.0 g of diethylene glycol are added to a 3000 ml round-necked flask equipped with thermometer, nitrogen inlet, stirrer and heating mantle. The mixture is then heated at 120° C. until a homogenous mixture is formed. 750 g of PET are now added to the mixture. The reaction is further heated at 240° C. and the water of reaction formed continuously removed. During the whole synthesis the PET flakes are slowly decomposed and a transparent mixture is formed, which is condensed until a product with an acid number <1.0 mg KOH/g is obtained.

The polymer obtained has the following properties
Hydroxyl number: 113.8 mg KOH/g
Acid number: 0.4 mg KOH/g
Viscosity at 75° C.: 381 mPas 3 Methods 3.1 Viscosity Determination:

Unless otherwise stated, the viscosity of the polyols was determined at 75° C. according to DIN EN ISO 3219 (Issue Jan. 10, 1994) with a rotational viscometer Rheotec RC 20 using the spindle CC 25 DIN (spindle diameter: 12.5 mm; measuring cylinder internal diameter: 13.56 mm) at a shear rate of 50 1/s.

3.2 Measurement of the Hydroxyl Number:

The hydroxyl numbers were determined by the phthalic anhydride method DIN 53240 (Issue: Jan. 12, 1971) and stated in mg KOH/g.

3.3 Measurement of the Acid Number:

The acid number was determined according to DIN EN 1241 (Issue: Jan. 5, 1998) and is stated in mg KOH/g.

4 General Production Example

The polyols were placed at 80° C. in a vessel and mixed with the components according to table 1 with vigorous stirring. The reaction mixture heated itself to over 110° C. and was then poured out onto a heated, Teflon-coated bench. The cast slab obtained was heated for 15 hours at 80° C., then granulated and processed by injection molding.

TABLE 1

Compounds Used

|  | Comparison 1 | Example 1 | Example 2 | Example 3 | Comparison 2 | Example 4 |
|---|---|---|---|---|---|---|
| Polyol 1 [g] | 800.0 | | | | | |
| Polyol 2 [g] | | | | | 800.0 | 160.0 |
| Polyol 3 [g] | | 800.0 | | | | |
| Polyol 4 [g] | | | 800.0 | | | 640.0 |
| Polyol 5 [g] | | | | 800.0 | | |
| CE [g] | 100.9 | 104.7 | 111.7 | 112.3 | 108.3 | 107.8 |
| Isocyanate 1 [g] | 384.0 | 428.7 | 510.5 | 518.0 | 504.0 | 497.9 |
| Stabilizer 1 [g] | 6.4 | 6.4 | 6.4 | 6.4 | | |
| Stabilizer 2 [g] | | | | | 14.2 | 14.2 |
| Index | 1000 | 1000 | 1000 | 1000 | 1000 | 1000 |
| Hard segment content | 29.7% | 29.7% | 29.7% | 29.7% | 29.0% | 29.0% |
| Start temperature | 80° C. | 80° C. | 80° C. | 80° C. | 80° C. | 80° C. |
| Casting temperature | 110° C. | 110° C. | 110° C. | 110° C. | 110° C. | 110° C. |

5 Mechanical Properties

The measured values compiled in table 2 were obtained from injection molded plates or from extrusion products of example 1 and 2.

TABLE 2

Mechanical properties for examples 1 and 2

|  | Example 1 | Example 2 |
|---|---|---|
| Shore D | 52 | 77 |
| Tensile strength | 46 Mpa | 42 Mpa |
| Elongation at break | 580% | 500% |
| Tear growth resistance | 120 kN/m | 237 kN/m |
| Abrasion | 48 mm$^3$ | 43 mm$^3$ |

The following properties of the polyurethanes obtained were determined by said methods:
Hardness: DIN ISO 7619-1
Tensile strength and elongation at break: DIN 53504
Tear growth resistance: DIN ISO 34-1, B (b)
Abrasion measurement: DIN ISO 4649

6 Determination of the Shrinkage Behavior

Ca. 1.5 cm wide and 9.3 cm long strips are cut out from injection molding plates (MB*) and heated for 30 mins at 120° C. in the heating oven. Next, the strips are elongated by means of two grippers and cooled under running cold water. After this, the molded body MB is again placed into the heating oven at 120° C. and the nature of the recovery behavior observed.

For various samples, the shrinkage behavior was determined according to the general determination method. The results are summarized in Table 3.

TABLE 3

| Sample | Length after pulling (MB) | Stretching to | Observation in hot water after shrinkage | Shrinkage by |
|---|---|---|---|---|
| Comparison 1 | 10 cm | 107% | shrinks to 9.7 cm | 3% |
| Example 1 | 16 cm | 172% | shrinks to 9.6 cm | 40% |
| Example 2 | 15.5 cm | 167% | shrinks to 9.5 cm | 39% |
| Example 3 | 14.2 cm | 153% | shrinks to 9.5 cm | 33% |
| Comparison 2 | 9.8 cm | 105% | shrinks to 9.6 cm | 2% |
| Example 4 | 17 cm | 183% | shrinks to 9.5 cm | 44% |

LITERATURE CITED

JP 2005102953
WO 2011/060970 A1
US 2012/0279101 A1
WO 2015/144435 A1
U.S. Pat. No. 7,524,914 B2
"Kunststoffhandbuch, Band 7, Polyurethane", Carl Hanser Verlag, 3. Auflage, 1993, Kapitel 3.1 and S. 103-113

The invention claimed is:
1. A method for producing a molded body MB, the method comprising:
 (a) producing a thermoplastic polyurethane by reacting
  (i) at least one polyisocyanate composition,
  (ii) at least one chain extender, and
  (iii) at least one polyol composition,
 wherein the polyol composition comprises at least one polyol P1 which contains at least one aromatic polyester block B1, wherein the aromatic polyester block B1 is a polyethylene terephthalate block;
 (b) producing a molded body MB* from the thermoplastic polyurethane,
 (c) heating the molded body MB* to a temperature below a temperature at which there is permanent deformability of the molded body MB* and above a switching temperature of the thermoplastic polyurethanes, to obtain a heated molded body MB*,
 (d) elongating the heated molded body MB* to obtain the molded body MB, and
 (e) cooling the molded body MB to a temperature below the switching temperature of the thermoplastic polyurethane,
 wherein a start of the permanent deformability corresponds to a start of melting of a hard phase of the thermoplastic polyurethane, and the switching temperature corresponds to a start of phase transition lying highest in the temperature before the melting range.
2. The method of claim 1, wherein the thermoplastic polyurethane is a compact thermoplastic polyurethane.
3. The method of claim 1, wherein the switching temperature of the thermoplastic polyurethane lies in a range from 0 to 130° C.
4. The method of claim 1, wherein the elongation of the molded body MB in (d) in at least one dimension is at least 150% of the elongation of the molded body MB*.
5. The method of claim 1, wherein the molded body MB* in (b) is produced by extrusion, injection molding, a sinter method, or from solution.

6. The method of claim 1, wherein the chain extender used in (a) is a diol with a molecular weight Mw<220 g/mol.

7. The method of claim 1, wherein the chain extender used in (a) and the polyol P1 contained in the polyol composition are used in a molar ratio from 40 to 1 to 1 to 10.

8. The method of claim 1, wherein the polyol composition comprises a further polyol selected from the group consisting of a polyetherol, a polyesterol, a polycarbonate alcohol, and a hybrid polyol.

9. The method of claim 1, wherein the polyisocyanate composition is an aromatic diisocyanate.

10. The method of claim 1, wherein the molded body MB through heating to a temperature above the switching temperature undergoes a recovery.

11. The method of claim 10, wherein the molded body MB through heating to a temperature above the switching temperature undergoes a recovery by at least 20%.

12. A molded body, obtained by the method of claim 1.

13. The molded body of claim 12, which is a tube or a film.

14. A thermoplastic polyurethane, obtained by a method comprising: reacting at least components (i) to (iii):
   (i) a polyisocyanate composition,
   (ii) at least one chain extender, and
   (iii) at least one polyol composition,
   wherein the polyol composition comprises at least one polyol P1 which contains at least one aromatic polyester block B1,
   wherein the aromatic polyester block B1 is a polyethylene terephthalate block,
   wherein the polyol P1 has a molecular weight Mn ranging from 500 to 2500 g/mol and is based on polybutylene terephthalate or polyethylene terephthalate,
   wherein the polyol P1 contains 1 to 70 wt. % of the aromatic polyester blocks B1,
   wherein the chain extender is a diol with a molecular weight Mw<220 g/mol, and
   wherein the polyisocyanate composition is an aromatic diisocyanate.

15. The molded body of claim 12, which has shape memory effect in a temperature range from 0° C. to 130° C.

16. The molded body of claim 12, which is a shrink tube or a shrink film.

* * * * *